May 18, 1943.  W. R. GRISWOLD ET AL  2,319,226
MOTOR VEHICLE
Filed March 21, 1941
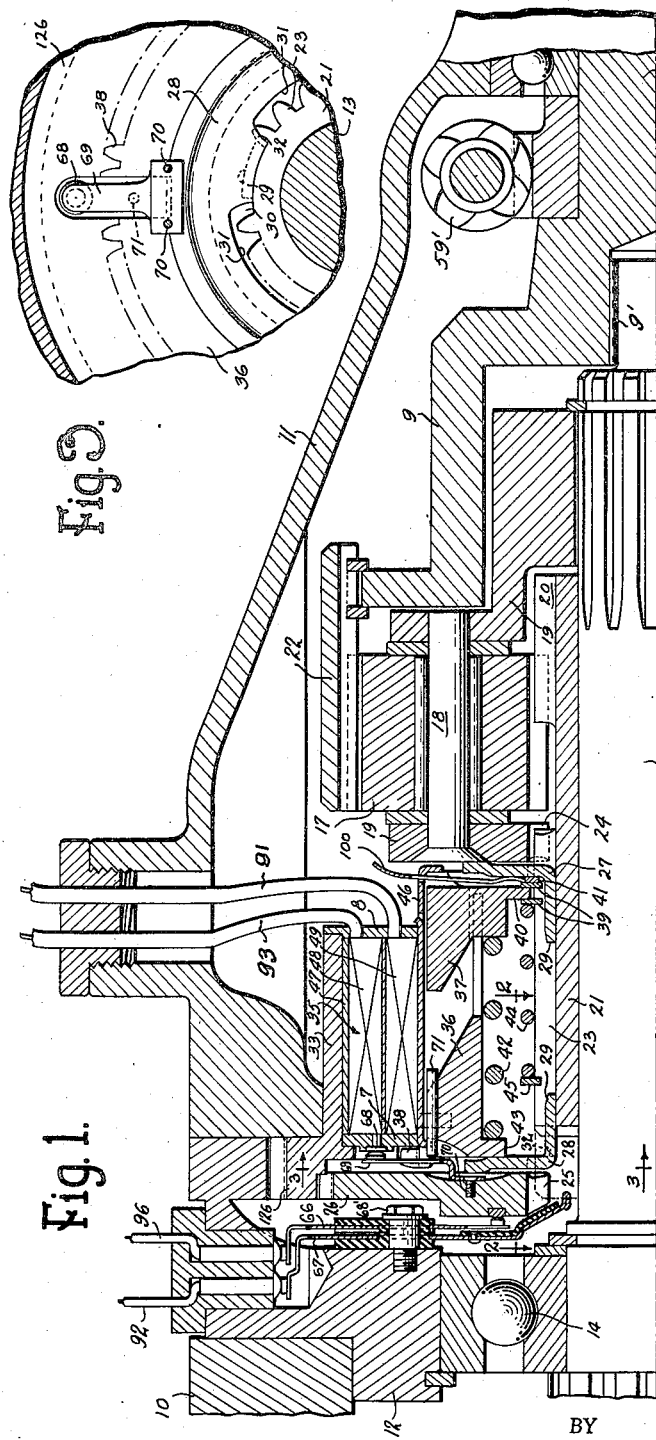
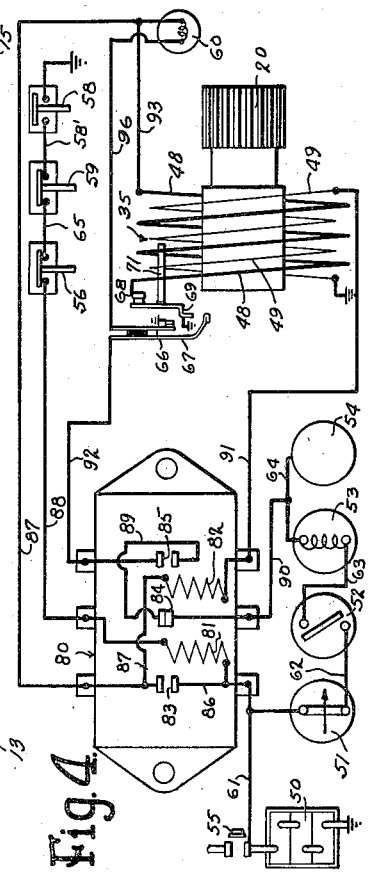
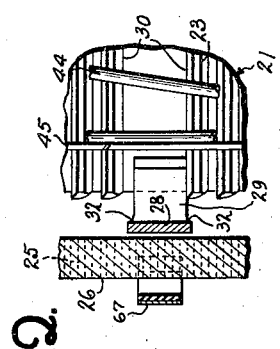
INVENTORS
Walter R. Griswold and
James H. O'Brien
BY Tibbetts & Hart
Attorneys Patented May 18, 1943

2,319,226

UNITED STATES PATENT OFFICE 2,319,226

MOTOR VEHICLE

Walter R. Griswold and James H. O'Brien, Detroit, Mich., assignors to Packard Motor Car Company, Detroit, Mich., a corporation of Michigan Application March 21, 1941, Serial No. 384,440

20 Claims. (Cl. 74—472)

This invention relates to improvements in transmission mechanism for motor vehicles and more particularly to drive modifying mechanism for change speed gearing.

For many years motor vehicle transmission mechanism has included gearing through which a plurality of forward drives and a reverse drive could be established by manual shifting operations. In recent years such transmission mechanism has also included planetary gearing under control of a governor for establishing an additional forward drive and under control of the accelerator pedal for establishing the drive dictated by the manually shiftable mechanism. The additional drive established by the governor is generally an overdrive.

A considerable portion of the planetary gearing control mechanism has been located exteriorly of the transmission mechanism casing. When such planetary gearing has been made ineffective, the manually controlled power output shaft of the change speed gearing has been connected to drive the tail shaft through a one-way overrunning clutch, so that the drive has been shunted around the planetary gearing. Thus direct drive between the change speed gearing and the tail shaft has been transmitted through a freewheeling driving connection which has disadvantages under certain driving conditions.

An object of this invention is to provide a more compact speed modifying mechanism, of the type referred to, through the placement of some of the control mechanism within the gear casing.

Another object of the invention is to provide transmission mechanism, of the type referred to, in which the freewheeling driving connection is eliminated.

Another object of the invention is to provide speed modifying mechanism, of the character referred to, through which the drive will be positive when driving either forward or reverse.

Other objects of the invention will appear from the following description taken in connection with the drawing, which forms a part of this specification, and in which:

Fig. 1 is a sectional fragmentary view of a transmission mechanism incorporating the invention;

Fig. 2 is a fragmentary plan view of one of the blocker mechanisms taken substantially on line 2—2 of Fig. 1;

Fig. 3 is a sectional view of the mechanism taken on line 3—3 of Fig. 1;

Fig. 4 is a diagrammatic view of the control mechanism employed with the transmission mechanism.

In view of the general knowledge of motor vehicle structure, only those parts necessary to illustrate the invention have been shown in the drawing, but for a more complete showing reference may be had to copending application Serial No. 321,474, filed February 29, 1940. The transmission casing consists of change speed gearing housing 10, speed modifying mechanism housing 11 and ring housing member 12. Suitable means can be employed to secure such housings integrally together with the ring member in the middle. The power output shaft 13 of conventional manually controlled change speed gearing extends from housing 10 and through ring housing 12 into housing 11, such shaft being mounted in bearing 14 carried by the ring housing member. Tail shaft 15 extends into housing 11 and has an enlarged hollow end 9 in which is carried a roller bearing 9' supporting the rear end of shaft 13.

Planetary gearing is arranged in housing 11 in relation to couple shafts 13 and 15. Planet gears 17 are rotatably mounted on pins 18 fixed to carrier 19 that is splined on shaft 13. A sun gear 20 is formed or fixed on sleeve 21 that is rotatably mounted and axially adjustable on shaft 13, and a ring gear 22 is fixed to rotate with the enlarged hollow end 9 of shaft 15. The sun gear and ring gear are in constant mesh with the planet gears, and this is true even though the sun gear is shiftable axially with the sleeve with which it is integral.

The sun gear sleeve can be locked to the carrier so that the planetary gearing will provide a direct positive coupling between shafts 13 and 15, or it can be held stationary to modify the drive through the planetary gearing and preferably so that shaft 15 will be driven faster than shaft 13. In order to selectively obtain the desired planetary gearing coupling arrangement, the sun gear sleeve is formed with spaced groups of peripheral teeth 23 that are engageable endwise with internal teeth 24 formed on the forward end of the carrier or with teeth 25 formed on a ring abutment member 26 that is telescoped into and fixed to the forward end of another ring member 126 suitably fixed to the casing member 12. The length of teeth 23 axially on the sleeve is less than the distance between teeth 24 and teeth 25 so that only one end of the groups of teeth can be engaged at a time.

A pair of blocker members 27 and 28 are provided to prevent engagement of teeth 23 with teeth 25 before rotation of the sun gear sleeve has ceased and to prevent engagement of teeth 23 with teeth 24 before the carrier reaches the same speed as the sleeve. These blocker members are in the form of rings having a plurality of axially extending tongues 29 arranged to lie in the spaces 30 between the groups of teeth 23. These tongues serve to rotate the blocker rings with the sun gear sleeve although there can be a limited rotation relatively as the spaces 30 are slightly wider than the tongues. The blocker rings are formed with relieved portions between and radially outwardly from the sides of the tongues, as indicated at 31, to permit the end portions of the groups of sun gear teeth to clear therethrough. Shoulders 32 are thus formed on the blocker rings at each side of the bases of the tongues 29 and provide blocking surfaces which, due to torque, block movement of teeth 23 in an axial direction to engage with either teeth 24 or 25 until their R. P. M. becomes equal.

When the teeth 23 on the sun gear sleeve engage teeth 25 of the abutment member, the sun gear will be held stationary and the drive from shaft 13 to shaft 15 will be increased to an overdrive through the planetary gearing. When the teeth 23 on the sun gear sleeve engage teeth 24 of the carrier, the planetary gearing will be locked and will act as a positive coupling to transmit direct positive drive from shaft 13 to shaft 15.

Axial shifting of the sun gear and sleeve is controlled by electromagnetic means and by spring means acting in opposition. A solenoid, indicated generally at 35, encircles the toothed portion of the sun gear sleeve and has a cylindrical core 36, slidably splined at 38 to ring member 26, and a cylindrical armature 37 aligning axially with the core. Washers 39 encircle teeth 23 adjacent each end face of the armature flange 40 and have projections extending into spaces 31 between the groups of sun gear sleeve teeth. Coil spring 42 encircles the toothed portion of the sun gear sleeve and has one end bearing against flange 40 on the armature and the other end bearing against a flange 43 on the solenoid core. This spring 42 normally exerts pressure against the armature sufficient to engage the teeth 23 with the carrier teeth 24 through means of a split ring actuator 41 seated in an annular recess in the teeth 23, one of the washers 39 lying between the armature flange 40 and the actuator washer. The sun gear sleeve is thus normally urged into locked relation with the carrier so that a direct positive driving connection is made through the planetary gearing from shaft 13 to shaft 15.

Another coil spring 44 encircles the sleeve teeth 23, within spring 42, and bears at one end against the front washer 39. This spring 44 also bears against a split ring or retainer 45 seated in recesses in the teeth 23. This spring exerts less pressure than spring 42 but is compressed, when the solenoid is energized, to complete the shifting of the sun gear sleeve into engagement with teeth 25 when the blocker 28 permits. When such engagement takes place, the sun gear sleeve teeth will have been disengaged from the planetary carrier teeth and the sun gear will be held stationary so that the planetary gearing will modify the drive shaft 13 to 15 to provide, preferably, an overdrive connection. The core and the armature of the solenoid are housed in a shell 46 that is encircled by another shell 47 and between these shells is arranged a primary winding 48 and a grounded holding winding 49. The space for the windings between shells 46 and 47 is closed at the front end by a cap ring 7 and at the rear end by a cap ring 8. The shell 47 is suitably fixed in a chamber formed by ring member 126 and a cylindrical flange 33 projects rearwardly therefrom. The ends of shell 46 are turned inwardly to retain the core and armature therebetween.

The electrical system for controlling the engine ignition and the solenoid includes the grounded motor vehicle battery 50, ammeter 51, ignition switch 52, coil 53, ignition distributor 54 and engine starter switch 55. The ignition switch, ammeter and a manually controlled switch 56 can be arranged at the vehicle instrument panel (not shown). Switch 56, a governor controlled switch 58 and a foot operated kickdown switch 59 are connected in series. An indicator light structure 60 is also located at the instrument panel so that it can be readily observed by the driver of the vehicle. There is a conductor 61 between the battery 50 and the ammeter 51, another conductor 62 between the ammeter and the ignition switch 52, another conductor 63 between the ignition switch and the coil 53 and a conductor 64 between the coil and the distributor 54. Switch 58 is grounded and there is a conductor 58′ between this switch and the kick-down switch 59. There is a conductor 65 between the kick-down switch and the manually operable switch 56. The switch 58 is controlled by governor mechanism (not shown) operated by the tail shaft driven gear 59′, and the kick-down switch is operated by mechanism responsive to movement of the accelerator pedal (not shown).

In a space between the ring members 12 and 26 is arranged an insulated pair of spring switch members 66 and 67 secured by bolt 68′ engaging member 12. The switch member 66 is formed of leaf spring material that normally flexes away from grounded contact with the abutment ring 26, and member 67 is formed of similar material but normally flexes toward abutment member 26 to hold switch member 66 in contact with the grounded abutment member 26. The switch member 67 lies in the path of movement of the sun gear sleeve so that it will be grounded when engaged thereby and pushed forward when the teeth 23 move into engagement with teeth 25 on the ring member. This forward movement of switch 67 permits the switch member 66 to flex forwardly out of contact with the grounded member 26. The winding 48 connects with terminal 68 with which a movable switch member 69 normally contacts, such switch member being anchored to and grounded on the abutment member 26 by means of a screw 70.

Armature 37 is employed to actuate means for breaking the contact of switch 69 with terminal 68 when the solenoid has been energized. As one medium for providing this result, an actuator pin 71 is mounted in a cavity in the periphery of the solenoid core and bears at one end against the switch member 69. The pin is movable in an axial direction and is of such length that it will be engaged and moved by the armature, after travelling a predetermined distance approaching the core, to move the grounded switch member 69 out of contact with the terminal 68.

In the control system for the engine ignition and the solenoid there is a relay 80 having two coils 81 and 82 controlling the three plunger switches 83, 84 and 85. Conductor line 86 leads from line 61 to switch 83 and conductor line 87 leads from switch 83 to the signal light 60 and to the primary relay coil 82. Coil 81 is connected at one end with conductor line 86 and at the other end with conductor line 88 leading to the manually controlled lock-out switch 56. Switch 84 is connected with switch 85 by conductor line 89 and is connected with conductor line 64 by conductor line 90. Coil 82 is connected with the grounded solenoid winding 49 by a conductor line 91 and switch 85 is connected with switch member 67 by a conductor line 92. One end of the solenoid winding 48 is connected by conductor line 93 with conductor line 87 and the other end of this solenoid winding is connected with the normally closed grounded switch member 69. The switch 67 is normally open and in such position holds switch 66 closed so that it is grounded.

The governor controlled switch 58 is normally open when the vehicle speed is below some predetermined value and is closed above such speed value. The kick-down switch 59 is normally closed but can be opened through actuation of the accelerator pedal when pressed down beyond a position where the throttle valve is wide open. As switches 56, 58 and 59 are in series, they must all be closed to establish an overdrive through the planetary gearing and when any one of the switches is open then the drive through the planetary is unchanged.

As shown in the drawing, the drive through the planetary gearing from shaft 13 to shaft 15 is unchanged because the governor controlled switch is open. The same condition will be caused to exist if either of switches 56 or 59 is open. When switch 56 is open, the drive will remain direct regardless of the positions of switches 58 and 59 as the electrical control is broken. When the switch 56 is closed, overdrive is obtained upon closing of both switches 58 and 59 whereby the electrical control system becomes energized. When all of these switches are closed, relay switches 83 and 85, normally open, will close and the normally closed relay switch 84 will open. Current will flow to solenoid winding 48 through lines 87 and 93, and will also flow to solenoid winding 49 through line 91. The lamp will also be energized by a circuit through lines 96, 87 and switch 66. The solenoid winding 48 has set up sufficient magnetic flux in core 36 to pull the armature 37 forwardly and such armature movement will compress springs 42 and 44. The accelerator pedal is now allowed to lift sufficiently to reduce the speed of the carrier in order to relieve the torque holding the sleeve teeth 23 in engagement with teeth 24. Teeth 23 will now be disengaged from teeth 24 by the pressure of spring 44 against ring 45 and will move the sun gear sleeve forward until teeth 23 abut against blocker 28. Forward movement of the armature has engaged pin 71 and carried it forward to open switch 69 breaking the circuit to the solenoid coil 48. The solenoid coil 49 is still energized and will hold the armature in its forwardly shifted position against the returning action of springs 42 and 44. The signal light is on so that when the solenoid is first energized the vehicle driver will be reminded that torque reversal must occur before the sun gear sleeve teeth will be disengaged from teeth 24.

The blocker 28 is pressed frictionally against abutment member 26 by the core 36 under pressure of the spring 42 and thus frictionally retains the blocker in position on sleeve 21 to prevent engagement of teeth 23 with teeth 25 until torque reversal occurs. The accelerator pedal having been lifted to relieve torque on the sleeve, sun gear sleeve rotation is reversed and the groups of teeth 23 will move rotationally relative to the blocker to register with the relieved portions 31 through which they are moved by the cocked spring 44 into engagement with teeth 25. The sun gear sleeve is thus held stationary so that the tail shaft will be driven faster than the shaft 13. This connection is maintained by means of driving torque tending to hold the meshing teeth together and by the holding coil 49 maintaining the armature in forward position.

By opening any one of the switches 56, 58 or 59, the sun gear sleeve will be automatically shifted out of overdrive position and back to direct drive position. Assuming that any one of such switches is opened then the relay switches 83, 84 and 85 will assume the positions shown in Fig. 4 that current to coil 49 is cut off so and the ignition circuit from distributor 54 will be grounded temporarily through the engagement of switch 67 with the sun gear sleeve because magnetic flux holds relay switch 85 closed temporarily. The ignition will thus be temporarily grounded so that the torque reduction on the sun gear sleeve permits spring 42 to move the sleeve rearwardly moving teeth 23 away from teeth 25. Blocker 27 stops such sleeve movement by the spring prior to engagement of teeth 23 with teeth 24. As soon as the sleeve moves away from the switch 67, the ignition ground will be broken so that the ignition system will again function. The sun gear and sleeve will begin moving faster than the carrier and must be slowed down or the carrier speeded up in order that the teeth 23 can be moved to unblocked position in registration with relieved portions 31 to pass through the blocker and mesh with the teeth 24. Spring fingers 100 urge the blocker 27 against the carrier and this pressure together with the pressure of spring 42 holds the blocker in blocking position on the sun gear sleeve until the sleeve speed surpasses the speed of the carrier so that teeth 23 will be unblocked.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a drive modifying transmission, a driving shaft, a driven shaft, planetary gearing adapted to establish a driving connection between said shafts and including a driving planet gear carrier, and a sun gear fixed on a shiftable sleeve mounted on the driving shaft and movable into and out of clutched position with said carrier, stationary means engageable by said sleeve in another shifted position to lock said sun gear, a cylindrical solenoid encircling said sleeve and having an interior armature operable to shift said sleeve toward one of said positions, means operable to shift said sleeve toward the other of said positions when the solenoid is deenergized, an electric system connected with said solenoid, and governor means controlling said electric system.

2. In a drive modifying transmission, a driving shaft, a driven shaft, planetary gearing adapted to establish a driving connection between said shafts, said gearing including a driving planet gear carrier and a sun gear having an extended sleeve fixed thereto and mounted on said driving shaft, said sleeve being movable into and out of clutched position with said carrier, a stationary member engageable by said sleeve to lock the same when shifted into another position, a solenoid surrounding said sleeve and having an armature fixed to and operable to move said sleeve toward one of said positions, a spring between said solenoid and sleeve acting against said armature to move said sleeve to the other of said positions, an electric system for controlling said solenoid, and governor means controlling said electric system.

3. In a drive modifying transmission, a driving shaft, a driven shaft, planetary gearing coupling said shafts including a carrier and a sun gear having an extended sleeve axially shiftable and rotatably mounted on said drive shaft, fixed abutment means adapted to be engaged by said sleeve in one position of axial adjustment to hold said sun gear stationary, clutch means on said carrier adapted to be engaged by said sleeve in another position of axial adjustment, a solenoid encircling said sleeve including an axially shiftable armature fixed in an axial direction to said sleeve, means responsive to operation of said armature in one direction for shifting said sleeve in one direction, energy storing means for shifting said sleeve in the other direction when the solenoid is deenergized, an electric system for controlling said solenoid, and governor means controlling said electric system.

4. In a drive modifying transmission, a driving shaft, a driven shaft, planetary gearing coupling said shafts including a toothed carrier fixed to said drive shaft and a sun gear having a toothed sleeve axially shiftable and rotatably mounted on said drive shaft, fixed toothed abutment means engageable by the sleeve teeth in one position of axial adjustment, said toothed sleeve being engageable with the toothed carrier in another position of axial adjustment, a solenoid encircling said sleeve, and a pair of coil springs encircling said sleeve inside of said solenoid, one of said coil springs being acted on by said solenoid to engage said sleeve with said abutment and the other coil spring acting on said solenoid to engage said sleeve with said carrier when said solenoid is deenergized.

5. In a transmission having driving and driven shafts, speed modifying mechanism for drivingly coupling said shafts comprising planetary gearing geared to said shafts and including a driving planet gear carrier and an axially shiftable sun gear having an extended sleeve rotatable and axially shiftable on said driving shaft, stationary locking means engageable by said sleeve when shifted into one position, clutch means on the carrier engaged by the sleeve when shifted into another position, a solenoid encircling said sleeve, energy storing means operable by the solenoid to shift said sleeve in one direction, and a spring between the solenoid and sleeve operable to shift the sleeve in the other direction when the solenoid is deenergized.

6. In an overdrive transmission, driving and driven shafts, planetary gearing adapted to drivingly couple said shafts and including a driving planet gear carrier and a sun gear having an extended shiftable sleeve mounted on the driving shaft and normally in clutched relation with said carrier, a stationary lock member engageable by said sleeve when shifted out of clutched relation with said carrier, a solenoid encircling said sleeve, sleeve actuator means including a spring between the solenoid and sleeve operable by the solenoid armature when energized to move the sleeve out of engagement with said carrier and into fixed position with said lock member, and a spring between the solenoid and the sleeve acting against the solenoid armature to move said sleeve into clutched relation with said carrier.

7. In a transmission overdrive mechanism, a drive shaft, a driven shaft, planetary gearing adapted to drivingly connect said shafts and including a planet gear carrier fixed to said drive shaft and a sun gear and sleeve rotatable and axially shiftable in said drive shaft, a stationary abutment member adjacent the end of the sleeve remote from the sun gear, a solenoid encircling the sleeve between the abutment member and the carrier, a spring between the sleeve and the solenoid and actuated by the solenoid armature to move said sleeve into fixed relation with said abutment member when said solenoid is energized, and a coil spring between said solenoid and sleeve opposing movement of said armature when the solenoid is energized, and actuator means on said sleeve engaged by the solenoid armature and operable thereby in response to pressure of said coil spring to move said sleeve into fixed relation with said carrier.

8. In a transmission, a drive shaft, a driven shaft, planetary gearing adapted to drivingly couple said shafts and including an axially shiftable sun gear having a sleeve mounted on said drive shaft, and a planet gear carrier fixed to said drive shaft, a stationary member engageable by said sleeve in one position of axial shift, said sleeve being engageable to lock with said carrier in another position of axial shift, a solenoid having a core, an armature, and an armature shifting winding and an armature holding winding encircling said sleeve, said core lying adjacent the abutment member and the armature lying adjacent the carrier, resilient means normally spacing said core and said armature, a coil spring anchored to said sleeve exerting pressure against said armature, a sleeve actuator member engaged by said armature and responsive to pressure of the resilient means against said armature to move said sleeve into fixed engagement with said carrier, a controlled electric circuit means for energizing said windings, means responsive to movement of said sleeve when approaching said abutment member for breaking the circuit through said shifting winding, and means for breaking the circuit through said holding winding.

9. In a transmission, a drive shaft, a driven shaft, planetary gearing coupling said shafts including a driving planet gear cage and a sun gear having a projecting sleeve mounted on said shaft, a fixed solenoid surrounding said sleeve having shifting and holding windings and an axially movable armature, an actuator connection between the solenoid and the sleeve, a spring normally urging the sleeve into fixed relation with the carrier, a stationary lock member engageable by said sleeve to hold the sun gear, said solenoid being operable to shift the sleeve out of clutched relation and toward the lock member, an energy storing spring responsive to the solenoid shift of said sleeve for completing the shifting of the sleeve into engagement with the locking member, a governor controlled circuit for energizing said solenoid, and means actuated by the armature for breaking the circuit to the shifting winding prior to completion of the sleeve shift.

10. In a transmission, a drive shaft, a driven shaft, planetary gearing adapted to drivingly couple said shafts and including an axially shiftable sun gear having a sleeve extending therefrom mounted on said drive shaft and a planet gear carrier fixed to said drive shaft, a stationary abutment member engageable by said sleeve in one position of axial shift to lock the same together, said sleeve being engageable to lock the said carrier in another position of axial shift, a solenoid having a core, an armature, an armature shifting winding and an armature holding winding encircling said sleeve, said core lying adjacent the abutment member and the armature lying adjacent the carrier, energy-storing means normally spacing said core and said armature, a coil spring anchored to said sleeve and exerting pressure against said armature, a sleeve actuator member engaged by said armature and responsive to pressure of the energy-storing means against said armature to move said sleeve into locking engagement with said carrier, controlled electric circuit means for energizing said windings, and a pin actuated by said sleeve when approaching said abutment member for breaking the circuit through said shifting winding, and another means for breaking the circuit through said holding winding.

11. In a transmission, a drive shaft, a driven shaft, planetary gearing adapted to drivingly couple said shafts and including an axially shiftable sun gear having a sleeve extending therefrom mounted on said drive shaft and a planet gear carrier fixed to said drive shaft, a stationary abutment member engageable by said sleeve in one position of axial shift to lock the same together, said sleeve being engageable to lock the said carrier in another position of axial shift, a solenoid having a core, an armature, an armature shifting winding and an armature holding winding encircling said sleeve, said core lying adjacent the abutment member and the armature lying adjacent the carrier, energy-storing means normally spacing said core and said armature, a coil spring anchored to said sleeve and exerting pressure against said armature, a sleeve actuator member engaged by said armature and responsive to pressure of the energy-storing means against said armature to move said sleeve into locking engagement with said carrier, controlled electric circuit means for energizing said windings, a normally closed switch in the circuit means for said armature shifting winding, a pin engaging said switch, said pin being in the path of movement of said sleeve when approaching said abutment member and adapted to be actuated by the sleeve to open the switch, and means for breaking the circuit through said holding winding.

12. In a transmission, a drive shaft, a driven shaft, planetary gearing adapted to drivingly couple said shafts and including an axially shiftable sun gear having a sleeve extending therefrom mounted on said drive shaft and a planet gear carrier fixed to said drive shaft, a stationary abutment member engageable by said sleeve in one position of axial shift to lock the same together, said sleeve being engageable to lock the and carrier in another position of axial shift, a solenoid having a peripherally recessed core, an armature, an armature shifting winding and an armature holding winding encircling said sleeve, said core lying adjacent the abutment member and the armature lying adjacent the carrier, energy-storing means normally spacing said core and said armature, a coil spring anchored to said sleeve and exerting pressure against said armature, a sleeve actuator member engaged by said armature and responsive to pressure of the energy-storing means against said armature to move said sleeve into locking engagement with said carrier, controlled electric circuit means for energizing said windings, the circuit means to said abutment shifting winding having a normally closed switch member therein, a pin slidably mounted in the recess in said core and engaging said switch member, said pin being arranged in the path of movement of said sleeve to be actuated thereby when approaching said abutment member to open said switch member, and means for breaking the circuit through said holding winding.

13. In a transmission, a drive shaft, a driven shaft, planetary gearing adapted to drivingly couple said shafts and including an axially shiftable sun gear having a sleeve extending therefrom mounted on said drive shaft and a planet gear carrier fixed to said drive shaft, a stationary abutment member engageable by said sleeve in one position of axial shift to lock the same together, said sleeve being engageable to lock the said carrier in another position of axial shift, a solenoid having a peripherally recessed core, an armature, an armature shifting winding and an armature holding winding encircling said sleeve, said core lying adjacent the abutment member and the armature lying adjacent the carrier, energy-storing means normally spacing said core and said armature, a coil spring anchored to said sleeve and exerting pressure against said armature, a sleeve actuator member engaged by said armature and responsive to pressure of the energy-storing means against said armature to move said sleeve into locking engagement with said carrier, controlled electric circuit means for energizing said windings, the circuit means for energizing the armature shifting winding being grounded to said abutment member and including a normally closed switch member, a pin slidably mounted in the recess of the core and engaging said switch member, said pin lying in the path of movement of said sleeve when approaching said abutment member in a relation to be actuated thereby to move the switch member into position opening the associated circuit, and means for breaking the circuit through said holding winding.

14. In a transmission, a drive shaft, a driven shaft, planetary gearing coupling said shafts including a planet gear carrier fixed to the drive shaft and an axially shiftable sun gear and toothed extension sleeve rotatably mounted on the drive shaft, clutch means on the carrier, normally engaged by the sleeve teeth, a stationary lock member adapted to be engaged by the toothed sleeve, a solenoid operable to control the shift of said sleeve into engagement with said lock member, governor means controlling the current flow to said solenoid, an indicator lighting circuit energized in conjunction with said solenoid, and means actuated by said sleeve when moved into engagement with said lock member and operative to break the lighting circuit.

15. In a transmission, a drive shaft, a driven shaft, planetary gearing coupling said shafts including a planet gear carrier fixed to the drive shaft and an axially shiftable sun gear and toothed extension sleeve rotatably mounted on the drive shaft, clutch means on the carrier normally engaged by the toothed sleeve, a solenoid operable to control the shift of said sleeve into engagement with said locked member, governor means controlling the current flow to said solenoid, an indicator lighting circuit energized in conjunction with said solenoid, said lighting circuit being grounded to said locking member and including a control switch, and means actuated by said sleeve when moved into engagement with said locked member operative to open said control switch.

16. In a transmission, a drive shaft, a driven shaft, planetary gear coupling said shafts and including a planet gear carrier fixed to the drive shaft and an axially shiftable sun gear and toothed extension sleeve rotatably mounted on the drive shaft, clutch means on the carrier normally engaged by the sleeve teeth, a stationary lock member adapted to be engaged by the toothed sleeve to prevent rotation of said sun gear, a solenoid operable to control the shift of said sleeve into engagement with said lock member, governor means controlling current flow to said solenoid, a grounded indicator lighting circuit adapted to be energized in conjunction with said solenoid and including a sleeve opening switch member, and resilient means for holding said switch member closed, said resilient means being acted upon by said sleeve when moved into engagement with said locked member to release said lighting circuit switch.

17. In a drive modifying transmission, a driving shaft, a driven shaft, planetary gearing adapted to drivingly couple said shafts and including a planet gear carrier fixed to the drive shaft and an axially shiftable sun gear with an extended toothed sleeve rotatably mounted on the drive shaft, said carrier having teeth adapted to be engaged by the teeth on said sleeve, a stationary abutment member having teeth adapted to be engaged by the teeth on said sleeve, means for shifting said sleeve axially to selectively engage with said abutment or said carrier, and blocker rings one adjacent the abutment and one adjacent the carrier, said rings being mounted to turn with said sleeve and rotatable a limited extent relative thereto.

18. In a drive modifying transmission; a driving shaft; a driven shaft; planetary gearing having a ring gear fixed to rotate with the driven shaft, a carrier fixed to rotate with the drive shaft, a sun gear rotatably mounted and axially shiftable on the drive shaft, and planet gears mounted on the carrier and meshing with the ring gear and sun gear; a sleeve fixed to and extending from one face of the sun gear and provided with groups of peripheral teeth; teeth on the carrier adapted to be engaged by one end of the sleeve teeth; a stationary abutment member having teeth adapted to be engaged by the other end of the sleeve teeth; means for shifting said sleeve and sun gear axially; and a pair of blocker rings having tongues seated in the spaces between the groups of teeth on the sleeve adapted to have a limited rotation therein, and blocking shoulders at each side of the tongues with relieved portions between the shoulders through which the groups of sleeve teeth can pass, one of said blocker rings being adjacent the abutment member and the other blocker member being adjacent the toothed portion of the carrier.

19. In a motor vehicle, an engine having electric ignition, a drive shaft, a driven shaft, planetary gearing engaged between the drive shaft and the driven shaft including a planet gear carrier and a sun gear, clutch teeth on the planetary gearing carrier, a stationary abutment member having teeth thereon, a toothed sleeve fixed to the sun gear, spring means for shifting the sleeve into engagement with the carrier teeth, and means for shifting said sleeve to engage the teeth of the abutment member including a solenoid, and an ignition interrupting means having a circuit including the sun gear sleeve, said sleeve being effective to interrupt the ignition circuit only when engaged with the abutment member.

20. In a drive modifying transmission, a driving shaft, a driven shaft, planetary gearing coupling said shafts and including a planet gear carrier fixed to the drive shaft, a ring gear fixed to the driven shaft and a sun gear axially shiftable and rotatably mounted on said drive shaft, said sun gear having a sleeve extension with peripheral teeth spaced from the sun gear teeth, said carrier having clutch teeth adapted to be engaged by one end of the teeth of the sleeve extension when shifted axially in one position, a stationary toothed abutment adapted to be engaged by the other end of the teeth of the sleeve extension when shifted axially into another position, means automatically operable to selectively shift said sun gear and sleeve extension axially into said positions, and a ring having blocking portions between the carrier clutch teeth and the adjacent ends of the teeth on the sleeve extension, said ring being mounted to rotate with said sleeve extension and rotatable a limited extent relative thereto, said ring frictionally engaging the carrier to maintain the blocking portions in blocking position while said sun gear extension is rotating at a slower speed than the carrier.

WALTER R. GRISWOLD.
JAMES H. O'BRIEN.